(12) United States Patent  (10) Patent No.: US 9,077,556 B2
Fan et al.  (45) Date of Patent: Jul. 7, 2015

(54) METHOD AND SYSTEM FOR DIAGNOSING ACCESS NODE

(75) Inventors: Liang Fan, Shenzhen (CN); Bo Yuan, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 294 days.

(21) Appl. No.: 13/574,212

(22) PCT Filed: Oct. 14, 2010

(86) PCT No.: PCT/CN2010/077738
§ 371 (c)(1),
(2), (4) Date: Jul. 19, 2012

(87) PCT Pub. No.: WO2011/088692
PCT Pub. Date: Jul. 28, 2011

(65) Prior Publication Data
US 2012/0294183 A1  Nov. 22, 2012

(30) Foreign Application Priority Data
Jan. 22, 2010  (CN) .......................... 2010 1 0102692

(51) Int. Cl.
*H04J 1/16*  (2006.01)
*H04L 12/28*  (2006.01)
(Continued)

(52) U.S. Cl.
CPC ........ *H04L 12/2859* (2013.01); *H04L 41/0631* (2013.01); *H04L 41/0893* (2013.01); *H04L 43/10* (2013.01); *H04L 41/0645* (2013.01)

(58) Field of Classification Search
CPC .............. H04L 29/06; H04L 29/08072; H04L 29/2697; H04L 41/0213; H04L 41/12; H04L 43/50; H04L 45/00; H04L 45/02; H04L 47/10

USPC ......................................... 370/252, 241, 386
See application file for complete search history.

(56) References Cited

U.S. PATENT DOCUMENTS 6,324,577 B1 *  11/2001  Hirai .............................. 709/223
2004/0261116 A1 *  12/2004  Mckeown et al. ............. 725/109
2009/0161556 A1  6/2009  Qian

FOREIGN PATENT DOCUMENTS

CN  1832434 A  9/2006
CN  1901686 A  1/2007
(Continued)

OTHER PUBLICATIONS

P.R. China, State Intellectual Property Office, International Search Report for International Application No. PCT/CN2010/077738, mailed Jan. 20, 2011.
(Continued)

*Primary Examiner* — John Pezzlo
(74) *Attorney, Agent, or Firm* — Bright IP Law Offices

(57) ABSTRACT

A method for diagnosing an access node (AN) is provided, including: a service node (SN) sending a diagnosis query message to the AN; after receiving the diagnosis query message, the AN returning a diagnosis query response message to the SN; and the SN displaying a query result on a command line or sending the query result to a network management system. A system for diagnosing an AN is provided too. The method and system solve the communication problem between the network system, maintenance group or operator associated with the SN and the network system, maintenance group or operator associated with the AN. As a result, the diagnosis of the AN is fast and efficient, thereby improving the diagnosis efficiency during the network failure and subscriber service failure.

18 Claims, 5 Drawing Sheets

(51) Int. Cl.
*H04L 12/24* (2006.01)
*H04L 12/26* (2006.01)

(56) References Cited

FOREIGN PATENT DOCUMENTS

| CN | 101051979 A | 10/2007 |
|---|---|---|
| CN | 101193002 A | 6/2008 |
| CN | 101572650 A | 11/2009 |
| EP | 2169896 A1 | 3/2010 |
| WO | 2009024083 A1 | 2/2009 |

OTHER PUBLICATIONS

Protocol for Access Node Control Mechanism in Broadband Networks draft-ietf-ancp-protocol-08, S. Wadhwa, J. Moisand, S. Subramanian, Juniper Networks, T. Haag, Deutsche Telekom, N. Voigt, Siemens, R. Maglione, Telecom Italia, Nov. 9, 2009.

* cited by examiner

METHOD AND SYSTEM FOR DIAGNOSING ACCESS NODE

CROSS REFERENCE TO RELATED APPLICATIONS

This application is the U.S. National Stage of International Patent Application No. PCT/CN2010/077738 filed on Oct. 14, 2010, which claims priority to Chinese Patent Application No. 201010102692.2 filed on Jan. 22, 2010. Both the PCT Application and Chinese Application are hereby incorporated by reference in their entirety.

FIELD OF THE INVENTION

The disclosure relates to the field of network communications, in particular to a method and a system for diagnosing an access node.

BACKGROUND OF THE INVENTION

In recent years, with the rapid development of the telecommunication industry, the penetration of Internet has increased rapidly, and the upgrade speed of network capacity and performance of network equipment lag far behind the growth rate of Internet users and Internet service, resulting in frequent network failure and unstable quality of service, which is a big challenge to the network maintainability, thus, the whole quality of service of network is difficult to improve. Therefore, how to improve the maintenance efficiency of the current network so as to improve the quality of service of customer has become an increasingly important research subject.

The Service Node (SN), such as Broadband Remote Access Service (BRAS) and Service Router (SR), is a service control network element in the broadband network and plays an important role in the user management and user service control in the network. The Access Node (AN), such as Digital Subscriber Line Access Multiplexer (DSLAM), Optical Line Terminal/Optical Network Unit (OLT/ONU) and subscriber switch, is an access network element in the broadband network and plays the role of the "last kilometer" subscriber link access and management in the network. It is an important network element between end user and SN, and its configuration error, traffic congestion, facility failure and the like will affect the subscriber session and quality of service.

In the current broadband access network, the SN and AN are usually configured and maintained by different Network Management Systems (NMS) and, in many cases, belong to different maintenance groups, for example, SN maintenance group and AN maintenance group of an operator, or, in the Wholesale scenario, belong to different operators and are maintained by their respective maintenance groups.

In such cases, after a subscriber session failure, worsened quality of service or the like occurs, it may require cooperation across network management system, maintenance group or even operator to diagnose the problem, resulting in successive decrease of maintenance efficiency. Communication problem, such as unclear description of problem and repeated confirmation, happens frequently, especially across maintenance group or operator, making it difficult to achieve the effects of high efficiency and quick positioning.

According to the description above, the root cause for which the conventional art cannot diagnose the AN fast and efficiently is that two management systems work independently, thereby being incapable of fast and identically acquiring various diagnosis information. However, in the broadband network, the SN is a control node for subscriber session and service, and the SN, its management system and management personnel need to know the diagnosis information on the AN in time and accurately to confirm the cause of network failure or reduction in quality of service swiftly, so that, the conventional art cannot satisfy the service requirement very well.

SUMMARY OF THE INVENTION

For the reason above, the main objective of the disclosure is to provide a method and a system for diagnosing an access node to diagnose the AN fast and efficiently, thereby improving the diagnosis efficiency during the network failure and subscriber service failure.

To achieve the objective above, the technical solution of the disclosure is realized as follows.

A method for diagnosing an AN, includes:
an SN sending a diagnosis query message to the AN;
after receiving this message, the AN returning a diagnosis query response message to the SN; and
the SN displays a query result on a command line or sends the query result to a network management system.

The diagnosis query message carries a query object, which is one or more of the following: configuration information, service function related information, warning information and facility information.

The step that the SN sends the diagnosis query message to the AN includes:
a management system of the SN sending a diagnosis query instruction of the AN to the SN according to an actual diagnosis requirement and the SN sending the diagnosis query message to the AN according to the diagnosis query instruction; or
the SN automatically sending the diagnosis query message to the AN according to a predefined rule; or
the SN sending the diagnosis query message to the AN according to a user command.

The SN sends the diagnosis query message to the AN according to the Access Node Control Protocol (ANCP).

The SN sends the diagnosis query message to the AN according to the Virtual Broadband Access Server (VBAS) mechanism.

The SN is a Broadband Access Server (BAS), a Broadband Remote Access Server (BRAS), a Layer 2 Tunneling Protocol Network Server (LNS) or a Service Router (SR).

A system for diagnosing an access node, includes: an SN and an AN, wherein
the SN is used for sending a diagnosis query message to the AN and diagnosing
the AN according to a diagnosis query response message from the AN; and
the AN is used, after receiving the diagnosis query message from the SN, for returning the corresponding diagnosis query response message to the SN.

The diagnosis query message sent from the SN to the AN carries a query object which is one or more of the following: configuration information, service function related information, warning information and facility information.

The system further includes a management system of the SN, wherein
the management system is used for sending a diagnosis query instruction of the AN to the SN according to an actual diagnosis requirement; and
the SN is further used for sending the diagnosis query message to the AN according to the diagnosis query instruction from the management system.

The step of the SN sending the diagnosis query message to the AN includes: the SN automatically sending the diagnosis query message to the AN according to a predefined rule.

The SN is further configured to send the diagnosis query message to the AN according to a user command.

The step of the SN sending the diagnosis query message to the AN includes: the SN sending the diagnosis query message to the AN according to the access node control protocol (ANCP).

The SN sends the diagnosis query message to the AN according to the virtual broadband access server (VBAS) mechanism.

The SN is a broadband access server (BAS), a broadband remote access server (BRAS), a Layer 2 Tunneling Protocol network server (LNS) or a Service Router (SR).

The method and system for diagnosing an access node of the disclosure send a diagnosis query message to the AN directly when an SN needs to diagnose the AN, and perform the diagnosis according a diagnosis query response message returned from the AN so as to achieve the direct diagnosis of the AN by the SN. The disclosure solves the communication problem between the network system, maintenance group or operator associated with the SN and the network system, maintenance group or operator associated with the AN. As a result, the diagnosis of the AN is fast and efficient, thereby improving the diagnosis efficiency during the network failure and subscriber service failure.

DETAILED DESCRIPTION OF THE EMBODIMENTS

The basic idea of the disclosure is: when it is necessary to diagnose an AN, an SN sends a diagnosis query message to the AN and performs the diagnosis according to a diagnosis query response message returned from the AN.

For this reason, the disclosure provides a method and a system for diagnosing the access node with the working principle as follows: the SN sends a diagnosis query message (including configuration information, service function related information, warning information, facility information and the like) to the AN through a communication protocol, such as Access Node Control Protocol (ANCP) or Virtual Broadband Access Server (VBAS) mechanism, between the SN and AN, and the AN returns a query result to the SN after receiving the query message, so that a direct diagnosis of the AN by the SN is implemented. In the disclosure, the SN may be a subscriber service control device, for example, a Broadband Access Server (BAS), a Broadband Remote Access Server (BRAS), a Layer 2 Tunneling Protocol Network Server (LNS) and a Service Router (SR).

Figure 1:
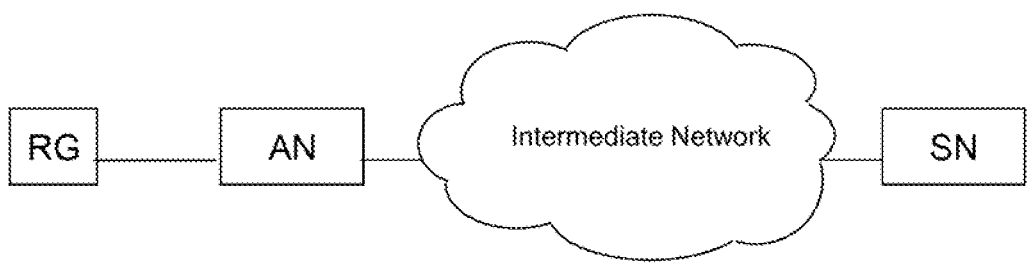
FIG. 1 is a network topology of the disclosure.
Figure 2:
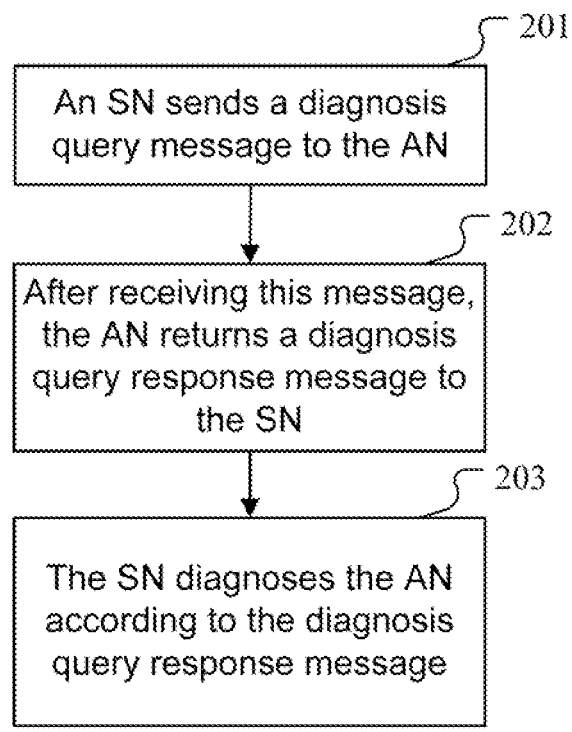
FIG. 2 is a diagram showing the flow of a method for diagnosing an access node of the disclosure.

FIG. 1 is a network topology of the disclosure. As shown, the network of the disclosure includes a Residential Gateway (RG), an AN, an intermediate network and an SN. FIG. 2 is a diagram showing the flow of a method for diagnosing an access node of the disclosure. As shown, the method includes the following steps.

Step 201: An SN sends a diagnosis query message to an AN.

Here, the SN may send the diagnosis query message to the AN according to a communication protocol, such as Access Node Control Protocol (ANCP), between the SN and AN, and this message carries a query object which may be one or more of the following: configuration information, service function related information, warning information and facility information.

Furthermore, there are many ways of triggering this diagnosis flow. For example, a management system of SN sends a diagnosis query instruction of the AN to the SN according to an actual diagnosis requirement, and the SN triggers this flow according to this instruction, or the SN automatically triggers this flow according to a predefined rule (e.g., detecting a loss of heartbeat message of a subscriber), or this process is triggered manually using a command line, i.e., the SN sends a diagnosis query message to the AN according to a user command.

Step 202: After receiving this message, the AN returns a diagnosis query response message to the SN.

Step 203: The SN diagnoses the AN according to the diagnosis query response message.

It should be explained that, the method above is applicable for the diagnosis during the network failure (for example, abnormal interruption of subscriber session), for the diagnosis during the compliant of reduction in quality of service by a subscriber (for example, the subscriber complains that the bandwidth is always below the subscription value), and furthermore, for the daily service examination.

It should be explained that, the method above may be cooperated with the current Operation Administration Management (OAM) mechanism (for example, Ethernet OAM protocol), ANCP protocol access link OAM mechanism (see Broadband Forum Technical Report TR-147) and Internet Engineering Task Force (IETF) (draft-ietf-ancp-protocol-06) between the SN and AN to realize the "one-stop" diagnosis of access link, AN and link between the SN and AN by the SN, thereby improving the maintenance efficiency of network and service.

The disclosure further provides a system for diagnosing an access node, including: an SN and an AN, wherein
the SN is used for sending a diagnosis query message to the AN and diagnosing
the AN according to a diagnosis query response message from the AN; and
the AN is used, after receiving the diagnosis query message from the SN, for returning the corresponding diagnosis query response message to the SN.

The diagnosis query message sent from the SN to AN carries a query object which is one or more of the following: configuration information, service function related information, warning information and facility information.

The system further includes a management system of the SN, wherein
the management system is used for sending a diagnosis query instruction of the is AN to the SN; and the SN is further used for sending the diagnosis query message to the AN according to the diagnosis query instruction from the management system.

The step of the SN sending the diagnosis query message to the AN includes: the SN automatically sending the diagnosis query message to the AN according to a predefined rule.

The SN is further used for sending the diagnosis query message to the AN according to a user command.

The step of the SN sending the diagnosis query message to the AN includes the SN sending the diagnosis query message to the AN through ANCP.

The SN sends the diagnosis query message to the AN according to the Virtual Broadband Access Server (VBAS) mechanism.

The SN is a subscriber service control device, such as BAS, BRAS, LNS and SR.

The disclosure will be described below in detail by the particular embodiments.

First Embodiment

Figure 3:
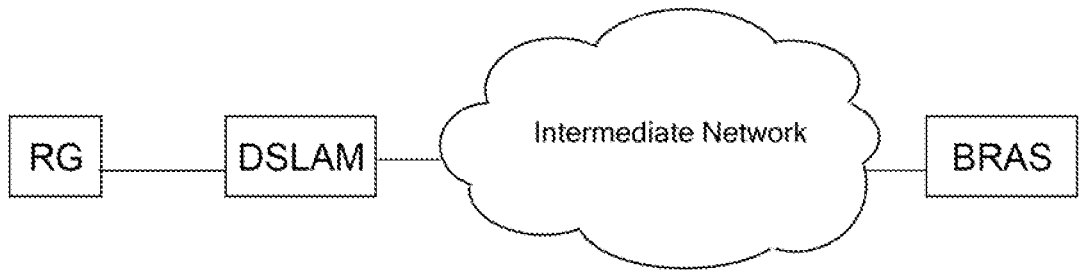
FIG. 3 is a network topology of the first embodiment of the disclosure.
Figure 4:
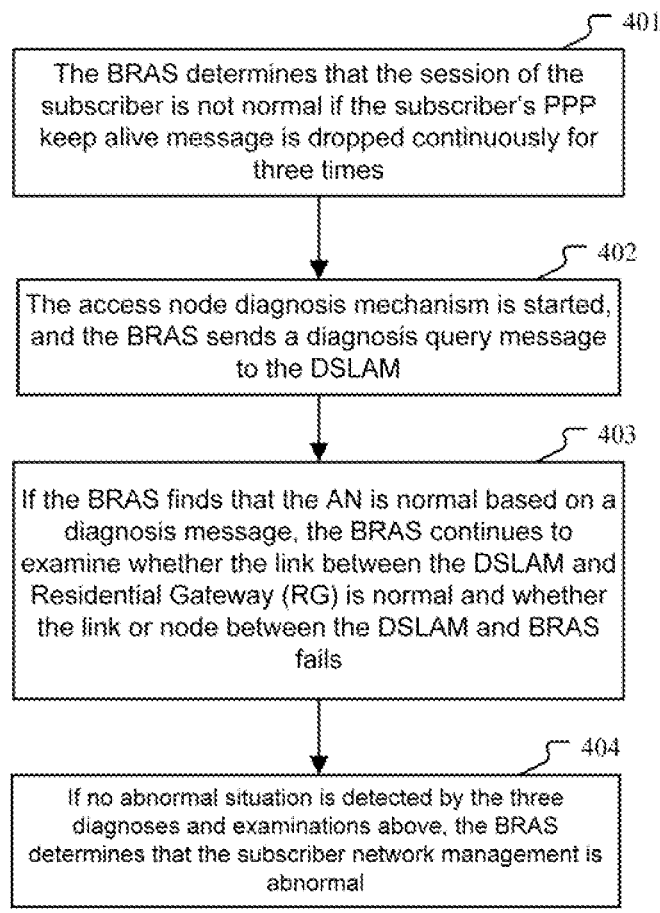
FIG. 4 is a diagram showing the flow of the first embodiment of the disclosure.

This embodiment describes the automatic diagnosis in case of abnormal session of a Point-to-Point Protocol over Ethernet (PPPoE) subscriber, and FIG. 3 is a network topology of this embodiment. As shown, the network of this embodiment includes a Residential Gateway (RG), a Digital Subscriber Line Access Multiplexer (DSLAM), an intermediate network and a Broadband Remote Access Server (BRAS). FIG. 4 is a diagram showing the flow of the first embodiment of the disclosure. As shown, this embodiment includes the following steps.

Step 401: The BRAS determines that the session of the subscriber is not normal if the subscriber's "PPP keep alive" message is lost three times consecutively.

Step 402: The access node diagnosis mechanism is started, and the BRAS sends a diagnosis query message to the DSLAM, and queries the DSLAM subscriber port configuration, uplink Virtual Local Area Network (VLAN) configuration of the subscriber, whether the uplink and downlink ports are congested, whether the system CPU is too high, etc.

Step 403: If the BRAS finds that the AN is abnormal based on a diagnosis message, the BRAS reports the abnormal situation to the management system; and if no abnormal situation is detected, the BRAS continues to examine whether the link between the DSLAM and Residential Gateway (RG) is normal and whether the link or node between the DSLAM and BRAS fails.

Step 404: If no abnormal situation is detected by the three diagnoses and examinations above, the BRAS determines that the subscriber network management is abnormal (for example, a disconnection of the network cable between the user's PC and RG).

Second Embodiment

Figure 5:
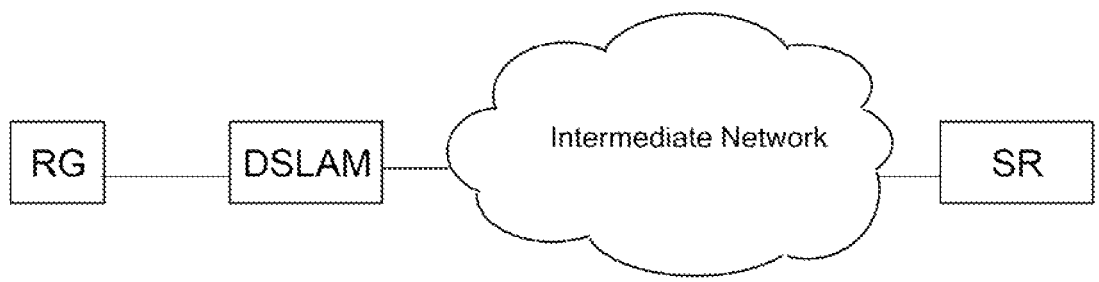
FIG. 5 is a network topology of the second embodiment of the disclosure.
Figure 6:
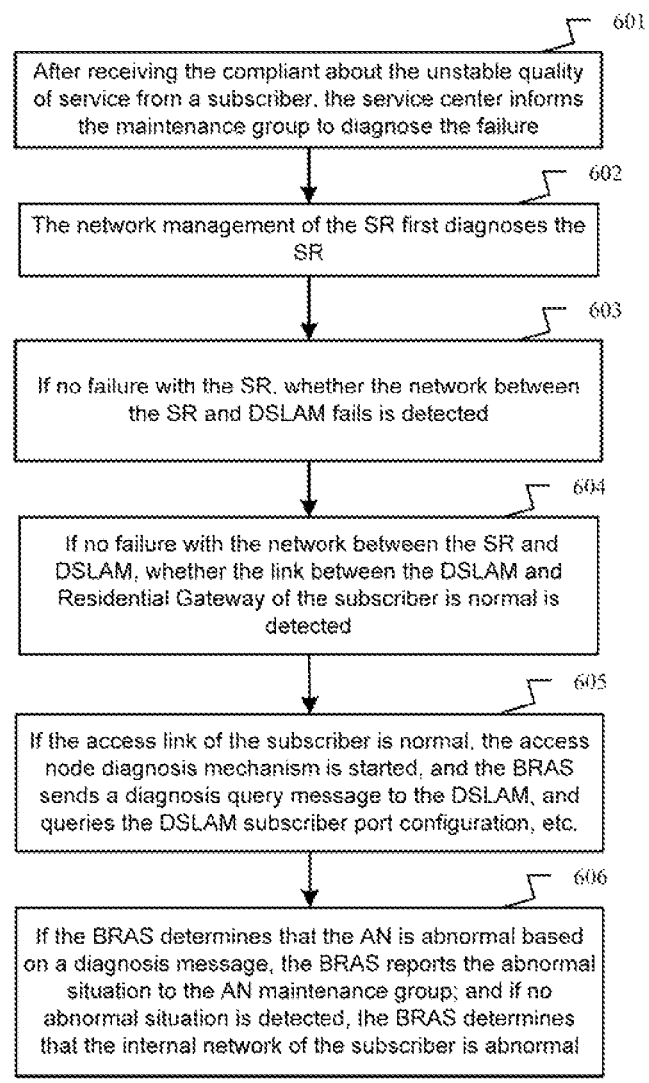
FIG. 6 is a diagram showing the flow of the second embodiment of the disclosure.

This embodiment describes the diagnosis of DSLAM by an SR as required when a subscriber complains that the quality of service is not stable, and FIG. 5 is a network topology of this embodiment. As shown, the network of this embodiment includes an RG, a DSLAM, an intermediate network and an SR. FIG. 6 is a diagram showing the flow of the second embodiment of the disclosure. As shown, this embodiment includes the following steps.

Step 601: After receiving the compliant about the unstable quality of service from a subscriber, the service center informs the maintenance group to diagnose the failure.

Step 602: The network management of the SR first diagnoses the SR.

Step 603: If no failure with the SR, the Ethernet OAM mechanism between the SR and DSLAM detects whether the network between the SR and DSLAM fails.

Step 604: If no failure with the network between the SR and DSLAM, the ANCP access link OMA mechanism detects whether the link between the DSLAM and Residential Gateway of the subscriber is normal.

Step 605: If the access link of the subscriber is normal, the access node diagnosis mechanism is started, and the BRAS sends a diagnosis query message to the DSLAM, and queries the DSLAM subscriber port configuration, uplink Virtual Local Area Network (VLAN) configuration of the subscriber, whether the uplink and downlink ports are congested, whether the system CPU is too high, etc.

Step 606: If the BRAS determines that the AN is abnormal based on a diagnosis message, the BRAS reports the abnormal situation to the AN maintenance group; and if no abnormal situation is detected, the BRAS determines that the internal network of the subscriber is abnormal.

Third Embodiment

Figure 7:
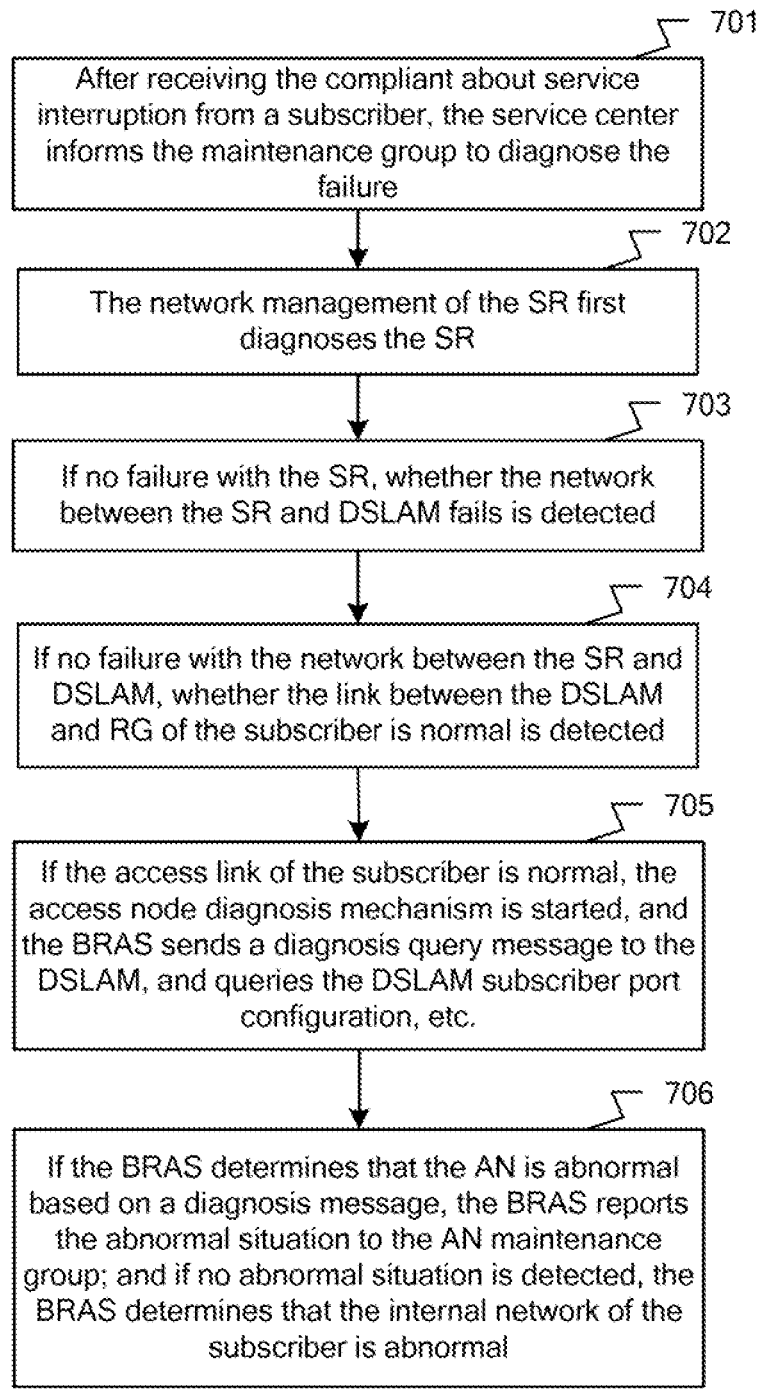
FIG. 7 is a diagram showing the flow of the third embodiment of the disclosure.

This embodiment describes the diagnosis of DSLAM by an SR after receiving a complaint about service interruption from an Internet Protocol over Ethernet (IPoE) subscriber, and the network of this embodiment is as shown in FIG. 5. FIG. 7 is a diagram showing the flow of the third embodiment of the disclosure. As shown, this is embodiment includes the following steps.

Step 701: After receiving the compliant about service interruption from a subscriber, the service center informs the maintenance group to diagnose the failure.

Step 702: The network management of the SR first diagnoses the SR.

Step 703: If no failure with the SR, the Ethernet OAM mechanism between the SR and DSLAM detects whether the network between the SR and DSLAM fails.

Step 704: If no failure with the network between the SR and DSLAM, the ANCP access link OMA mechanism detects whether the link between the DSLAM and RG of the subscriber is normal.

Step 705: If the access link of the subscriber is normal, the access node diagnosis mechanism is started, and the BRAS sends a diagnosis query message to the DSLAM, and queries the DSLAM subscriber port configuration, uplink Virtual Local Area Network (VLAN) configuration of the subscriber, etc.

Step 706: If the BRAS determines that the AN is abnormal based on a diagnosis message, the BRAS reports the abnormal situation to the AN maintenance group; and if no abnormal situation is detected, the BRAS determines that the internal network of the subscriber is abnormal (for example, the disconnection of the network cable between the user's PC and RG).

Fourth Embodiment

Figure 8:
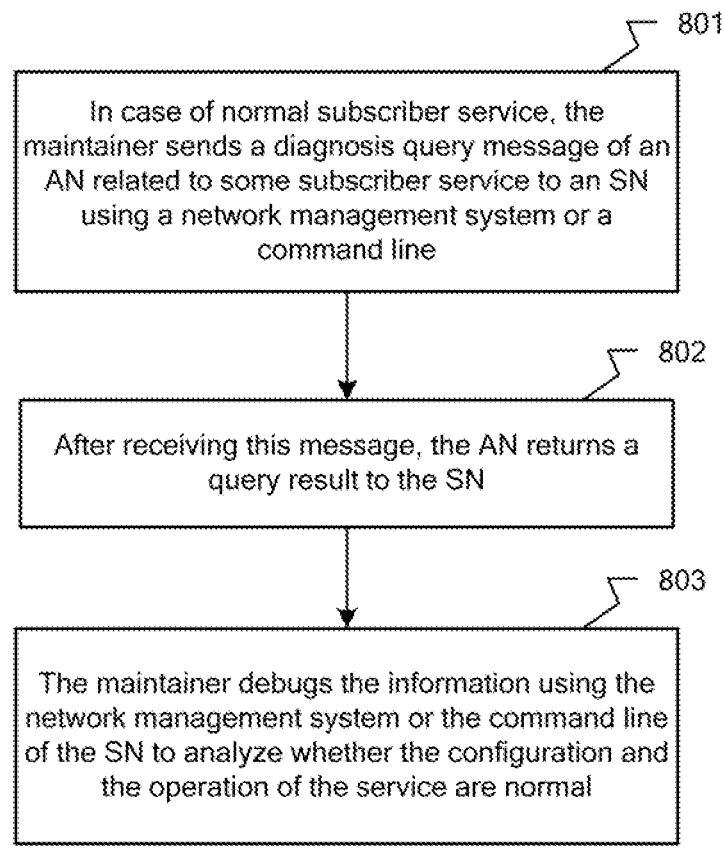
FIG. 8 is a diagram showing the flow of the fourth embodiment of the disclosure.

This embodiment describes the daily examination of subscriber service, and FIG. 8 is a diagram showing the flow of the fourth embodiment of the disclosure. As shown, this embodiment includes the following steps.

Step 801: In case of normal subscriber service, the maintainer sends a diagnosis query message of an AN related to some subscriber service to an SN using a network management system or a command line.

Step 802: After receiving this message, the AN returns a query result to the SN.

Step 803: The maintainer debugs the information using the network management system or the command line of the SN to analyze whether the configuration and the operation of the service are normal.

What is described above are only preferred embodiments of the disclosure, and not intended to limit the scope of protection of the disclosure.

What is claimed is:

1. A method for diagnosing an access node (AN), comprising:
   a service node (SN) sending a diagnosis query message to the AN, wherein the diagnosis query message carries a query object, which is one or more of the following: configuration information, service function related information, warning information and facility information;
   after receiving the diagnosis query message, the AN returning a diagnosis query response message to the SN; and
   the SN displaying a query result on a command line or sending the query result to a network management system.

2. The method according to claim 1, wherein the step of the SN sending the diagnosis query message to the AN comprises:
   a management system of the SN sending a diagnosis query instruction of the AN to the SN according to an actual diagnosis requirement and the SN sending the diagnosis query message to the AN according to the diagnosis query instruction; or
   the SN automatically sending the diagnosis query message to the AN according to a predefined rule; or
   the SN sending the diagnosis query message to the AN according to a user command.

3. The method according to claim 2, wherein the SN sends the diagnosis query message to the AN according to the Access Node Control Protocol (ANCP).

4. The method according to claim 2, wherein the SN sends the diagnosis query message to the AN according to the Virtual Broadband Access Server (VBAS) mechanism.

5. The method according to claim 2, wherein the SN is a Broadband Access Server (BAS), a Broadband Remote Access Server (BRAS), a Layer 2 Tunneling Protocol Network Server (LNS) or a Service Router (SR).

6. The method according to claim 1, wherein the SN sends the diagnosis query message to the AN according to the Access Node Control Protocol (ANCP).

7. The method according to claim 1, wherein the SN sends the diagnosis query message to the AN according to the Virtual Broadband Access Server (VBAS) mechanism.

8. The method according to claim 1, wherein the SN is a Broadband Access Server (BAS), a Broadband Remote Access Server (BRAS), a Layer 2 Tunneling Protocol Network Server (LNS) or a Service Router (SR).

9. A system for diagnosing an access node, comprising: a service node (SN) and an access node (AN), wherein
   the SN is configured to send a diagnosis query message to the AN and diagnose the AN according to a diagnosis query response message from the AN, wherein the diagnosis query message sent from the SN to the AN carries a query object which is one or more of the following: configuration information, service function related information, warning information and facility information; and
   the AN is configured, after receiving the diagnosis query message from the SN, to return the corresponding diagnosis query response message to the SN.

10. The system according to claim 9, further comprising: a management system of the SN, wherein
    the management system is configured to send a diagnosis query instruction of the AN to the SN according to an actual diagnosis requirement; and
    the SN is further configured to send the diagnosis query message to the AN according to the diagnosis query instruction from the management system.

11. The system according to claim 10, wherein the step of the SN sending the diagnosis query message to the AN comprises: the SN sending the diagnosis query message to the AN according to the Access Node Control Protocol (ANCP).

12. The system according to claim 9, wherein the step of the SN sending the diagnosis query message to the AN comprises: the SN automatically sending the diagnosis query message to the AN according to a predefined rule.

13. The system according to claim 12, wherein the step of the SN sending the diagnosis query message to the AN comprises: the SN sending the diagnosis query message to the AN according to the Access Node Control Protocol (ANCP).

14. The system according to claim 9, wherein
    the SN is further configured to send the diagnosis query message to the AN according to a user command.

15. The system according to claim 14, wherein the step of the SN sending the diagnosis query message to the AN comprises: the SN sending the diagnosis query message to the AN according to the Access Node Control Protocol (ANCP).

16. The system according to claim 9, wherein the step of the SN sending the diagnosis query message to the AN comprises: the SN sending the diagnosis query message to the AN according to the Access Node Control Protocol (ANCP).

17. The system according to claim 9, wherein the SN sends the diagnosis query message to the AN according to the Virtual Broadband Access Server (VBAS) mechanism.

18. The system according to claim 9, wherein the SN is a Broadband Access Server (BAS), a Broadband Remote Access Server (BRAS), a Layer 2 Tunneling Protocol Network Server (LNS) or a Service Router (SR).

* * * * *